(12) United States Patent
Acker et al.

(10) Patent No.: US 10,634,765 B1
(45) Date of Patent: Apr. 28, 2020

(54) INTERNAL WAVE AMBIENT NOISE TOMOGRAPHY FOR ANTISUBMARINE WARFARE

(71) Applicant: BAE SYSTEMS INFORMATION AND ELECTRONIC SYSTEMS INTEGRATION INC., Nashua, NH (US)

(72) Inventors: Andrew N. Acker, Honolulu, HI (US); Michael J. Deweert, Kailua, HI (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 266 days.

(21) Appl. No.: 15/806,528

(22) Filed: Nov. 8, 2017

(51) Int. Cl.
*G01S 5/18* (2006.01)
*G01K 7/22* (2006.01)
*G01S 17/42* (2006.01)
*G01S 17/86* (2020.01)

(52) U.S. Cl.
CPC ............... *G01S 5/18* (2013.01); *G01K 7/22* (2013.01); *G01S 17/42* (2013.01); *G01S 17/86* (2020.01)

(58) Field of Classification Search
CPC .......... G01S 5/18; G01S 17/023; G01S 17/42; G01K 7/22
See application file for complete search history.

(56) References Cited

U.S. PATENT DOCUMENTS

| 4,982,384 | A | * | 1/1991 | Pipkin | G01S 7/6272 367/113 |
|---|---|---|---|---|---|
| 9,476,700 | B2 | * | 10/2016 | DeWeert | G01B 11/162 |
| 9,880,305 | B2 | * | 1/2018 | Turgut | G01V 1/38 |
| 2015/0098306 | A1 | * | 4/2015 | Turgut | G01V 1/38 367/131 |
| 2015/0338208 | A1 | * | 11/2015 | DeWeert | G01B 11/162 356/520 |

* cited by examiner

*Primary Examiner* — Daniel Pihulic
(74) *Attorney, Agent, or Firm* — Sand, Sebolt & Wenow LPA; Scott J. Asmus (57) ABSTRACT

A system and method thereof identifies and locates a submarine or other similar object located in the ocean. The thermocline in the water column is utilized to identify objects based on signals carried by the internal wave (IW) in a mixed layer (ML) of water established between a less-dense and/or warmer upper layer of water and a more-dense and/or cooler lower layer of water. The system can detect objects moving in the ML. Additionally, the system detects non-moving objects in the ML based on shadowing and/or scattering effects established by naturally occurring waves contacting the object.

20 Claims, 2 Drawing Sheets

INTERNAL WAVE AMBIENT NOISE TOMOGRAPHY FOR ANTISUBMARINE WARFARE

BACKGROUND

Technical Field

The present disclosure relates generally to systems and methods for locating a remote object. More particularly, the present disclosure relates to locating a submerged object spaced apart at a remote distance from a sensor. Specifically, the present disclosure relates to analyzing and processing an internal wave (IW) in a fluid column to detect signatures of an object, such as a submarine, located near an interface between two fluid layers having differing parameters, such as different temperatures, different densities, or both.

Background Information

Antisubmarine warfare (ASW) refers generally to the process of locating submarines operating in the ocean. Typically, submarines can be located through visual means or acoustic means. Each manner for locating submarines have advantages in their own respect. Visual inspection of submarines can usually be accomplished when the submarine is operating at or near the surface, especially when the ocean water is clear. The acoustic manners of locating submarines can usually be performed when the submarines are operating at deep cruising depths.

Sometimes submarines operate near a transition layer below the ocean's surface. The transition layer of the ocean occurs naturally when less dense warmer water establishes a first layer located above more dense cooler water establishing a second layer. The transition layer is defined by an interface between the first and second layers.

The interface, established by the transition layer, acts as a medium along which waves travel. More particularly, oceanographic IWs propagate through the fluid/water column along the interface. Typically, there is a significant amount of omnibus ambient IWs that are random and are generated through natural currents and weather conditions. The naturally occurring IWs are scattered and have no clear directions or uniformity.

Due to the naturally occurring IWs at the interface, acoustic and visual detection of submarines operating in or near the transition layer can be difficult. More particularly, the natural IWs in the transition layer make acoustic detection difficult because of the scattering of the natural wave creates significant feedback and noise, rendering acoustic detection extremely difficult. Visual detection is further difficult in the transition layer due to the depth and movement of waves which may cause visual detections means to operate in an ineffective manner.

Passive and active acoustic sensors describe the current state of the art for long range ASW detection problem. For localization, acoustic sensors can be supplemented by passive and active optical sensors. Acoustic methods are becoming increasingly insufficient in light of the proliferation of quiet, inexpensive submarines. Further, the efficacy of acoustic and optical detection methods is diminished in acoustically noisy and optically turbid environments such as the littorals.

SUMMARY

Issues continue to exist with systems and methods for locating objects, such as a submerged vehicle, in a fluid column. Particularly, existing ASW capabilities are no longer keeping pace with the evolving submarine threat. Responding to this threat will require not only the development of new technologies, but also the identification of new ASW detection modalities. The present disclosure addresses these and other issues by providing a system and method to locate an object operating near a transition layer defined at an interface between a first fluid layer and a second fluid layer having different parameters, such as differing temperatures or different densities. The present disclosure implements a modality for ASW operations, wherein submarines are detected by persistent surveillance of the internal wave field, exploiting both IW wakes and the scattering of naturally occurring IWs by moving or stationary vehicles, thereby enabling low-cost, long-duration, wide-area surveillance. Stated otherwise, the present disclosure exploits information carried in the ocean IW field to provide a new ASW detection modality.

The present disclosure may provide a system for detecting the IW analogue to a seismic array. Such an array can support both active and passive ASW detection modes. In the active mode, time of arrival differences for a submarine's induced IWs at different array nodes allows target detection by triangulation and back-projection techniques. In the passive mode, submarines can be detected by their scattering effects on ambient-noise IWs by use of ambient noise tomography (ANT) techniques. This new modality would be insensitive to both the acoustic stealth of the target (the limiting factor in passive acoustic ASW) and to the optical turbidity of the water (the limiting factor in optical ASW).

In one aspect, an embodiment of the present disclosure may provide a method comprising: deploying at least one sensor into a fluid column to sense an IW in the fluid column near an interface between two fluid layers of differing parameters; sensing an IW in the fluid column with the sensor; locating a remote object from the IW sensed at the sensor; and reporting the location of the remote object. This exemplary embodiment or another exemplary embodiment may further provide mapping a dispersion relationship between a wavelength and frequency of the IW; and back projecting the IW to a ping, wherein the ping is generated by the remote object located near the interface between the two fluid layers. This exemplary embodiment or another exemplary embodiment may further provide sensing naturally generated ambient IWs; and filtering out the naturally generated ambient IWs. This exemplary embodiment or another exemplary embodiment may further provide identifying scatter in the IW generated by the remote object submerged in the fluid column; and processing the scatter to locate the remote object when the remote object is stationary in the fluid column. This exemplary embodiment or another exemplary embodiment may further provide processing signatures in the Ms moving in a first direction generated by the remote object; and processing deficiencies in the IW moving in an opposite second direction generated by the remote object. This exemplary embodiment or another exemplary embodiment may further provide sensing the remote object when the remote object transitions through the interface, wherein a ping is generated when the remote object transitions through the interface between the two layers in the fluid column. This exemplary embodiment or another exemplary embodiment may further provide wherein the remote object is a submersible vehicle, further comprising: identifying whether the submersible vehicle is within an area of interest based on the ping generated by the transition between the two layers in the fluid column; prosecuting the ping to determine the location of the submersible vehicle;

and sensing the IW at the interface with at least two strings of thermistors. This exemplary embodiment or another exemplary embodiment may further provide sensing the IW at the interface with an expendable thermograph. This exemplary embodiment or another exemplary embodiment may further provide sensing the IW at the interface with an unmanned submersible vehicle carrying the sensor and oscillating within the fluid column. This exemplary embodiment or another exemplary embodiment may further provide wherein the differing parameters between the two layers are temperature dependent, sensing a temperature profile of the fluid column with LIDAR on an aircraft flown above the fluid column. This exemplary embodiment or another exemplary embodiment may further provide wherein the different parameters refer to differing densities and differing temperatures between the two layers. This exemplary embodiment or another exemplary embodiment may further provide locating the sensor when the signal is received; and accounting for the sensor drifting in the fluid column. This exemplary embodiment or another exemplary embodiment may further provide determining the depth of the at least one sensor in the fluid column when the IW is sensed at the at least one sensor. This exemplary embodiment or another exemplary embodiment may further provide surveying, persistently, an area of interest for an extended period of time. This exemplary embodiment or another exemplary embodiment may further provide determining frequency characteristics of the IW over a period of time, wherein the period of time exceeds at least one day so as to effectuate persistent surveillance of an area of interest in an ocean. This exemplary embodiment or another exemplary embodiment may further provide processing local oceanographic data, wherein the ambient IW is filtered out based, at least in part, on the local oceanographic data. This exemplary embodiment or another exemplary embodiment may further provide recording, at least temporarily, the location of the remote object in computer implemented medium.

In another aspect, an exemplary embodiment of the present disclosure may provide a system for detecting a remote object submerged in a fluid column comprising: at least one sensor for sensing at least one of a temperature profile of the fluid column or a density profile in the fluid column, wherein a fluid interface is defined between a less dense warmer first fluid layer and a more dense cooler second fluid layer, wherein the second layer is below the first layer; at least one non-transitory computer readable storage medium having instructions encoded thereon that, when executed by at least one processor, performs operations to locate a submerged vehicle in the fluid column located in an area of interest remotely from the at least one sensor, and the instructions including: logic to sense a signal carried by an IW moving along the interface; logic to back propagate the sensed signal to determine a signal source location; and logic to record the signal source location. This exemplary embodiment or another exemplary embodiment may further provide a string of thermistors submerged in the fluid column, wherein the at least one sensor is a thermistor on the string. This exemplary embodiment or another exemplary embodiment may further provide a pressure transducer on the string adapted to determine depth of the thermistor. This exemplary embodiment or another exemplary embodiment may further provide a shadow in the IW created by the remote object remaining stationary near the interface, or a scattering of the IW. This exemplary embodiment or another exemplary embodiment may further provide a signature in the IW created by the remote object moving near the interface. This exemplary embodiment or another exemplary embodiment may further provide a ping generated by the remote object transition from the first fluid layer to the second fluid layer, or vice versa. This exemplary embodiment or another exemplary embodiment may further provide local oceanographic data including an ambient IW spectrum, wherein the ambient IW spectrum is filtered out to locate the remote object based, at least in part, on the sense signal. This exemplary embodiment or another exemplary embodiment may further provide wherein the at least one sensor is submerged in the fluid column at a depth in a range from about 1 m to about 100 m.

In accordance with one aspect of the present disclosure, an exemplary embodiment may provide a system comprising: a temperature sensor submerged in a fluid; at least one non-transitory computer readable storage medium operatively connected with the temperature sensor, the storage medium having instructions encoded thereon that, when executed by at least one processor, performs operations to detect an object in the fluid based on Ms of the fluid, the operations including: detect a first temperature of the fluid at a first time; detect a second temperature of the fluid at a second time later than the first time; and determine a location of the object in the fluid based on the first temperature at the first time and the second temperature at the second time.

In accordance with another aspect of the present disclosure, an exemplary embodiment may provide a method of detecting the presence of an object submerged in fluid comprising: submerging at least one temperature sensor in a fluid; recording a first temperature of the fluid at a first time; recording a second temperature of the fluid at a second time; wherein an IW passes the at least one temperature sensor between the first time and the second time; and determining a location of an object in the fluid based on the first temperature at the first time and the second temperature at the second time.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
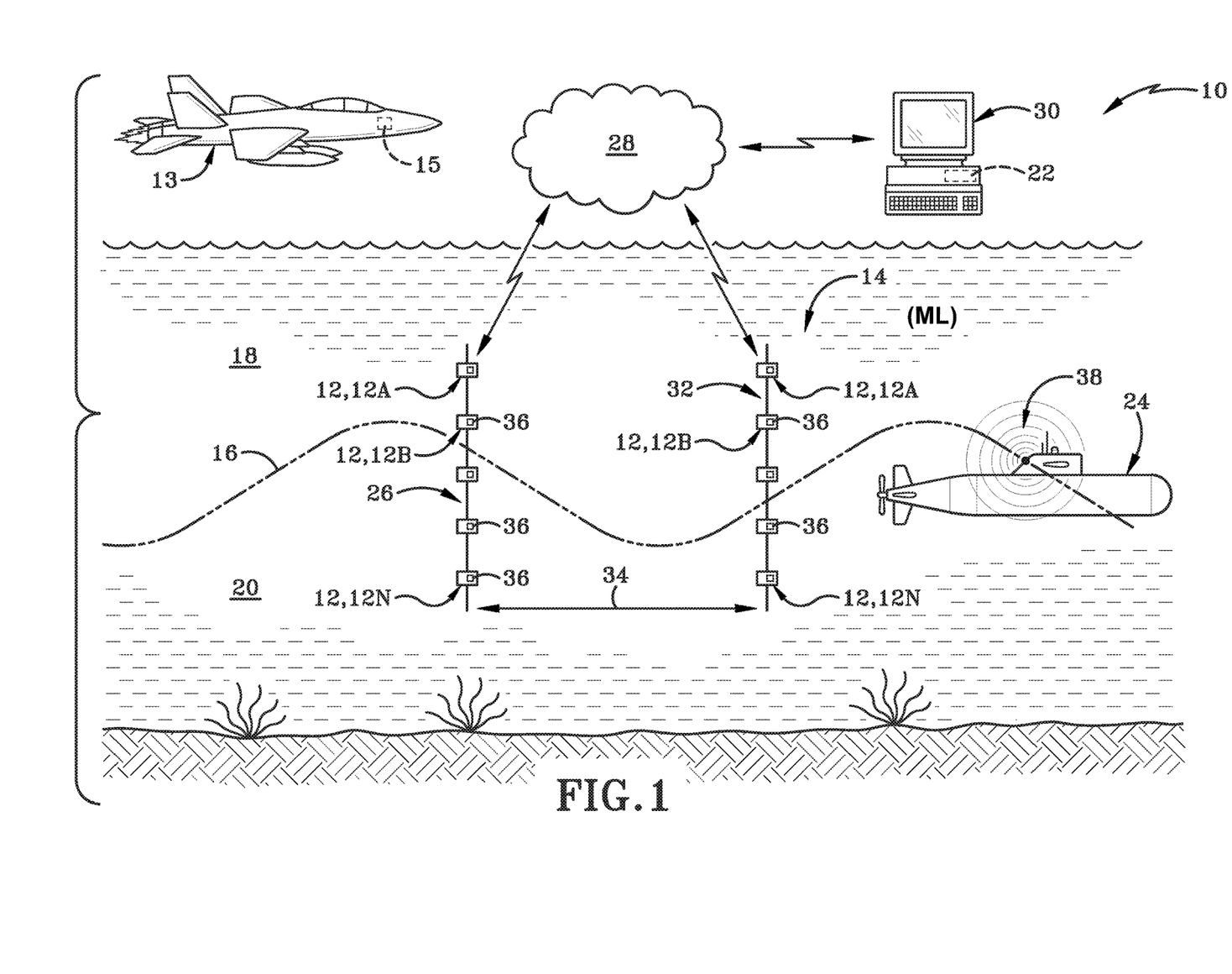
FIG. 1 is a diagrammatic view of an exemplary system in accordance with the present disclosure for detecting signals in an IW.

FIG. 1 depicts a system in accordance with the present disclosure for detecting signals in an internal wave (IW) generally at 10. System 10 includes at least one sensor 12 for sensing at least one of a temperature profile of the fluid column 14 or a density profile in the fluid column 14, wherein a fluid interface 16 is defined between a less dense warmer first fluid layer 18 and a more dense cooler second fluid layer 20, wherein the second layer 20 is below the first layer 18, and at least one non-transitory computer readable storage medium 22 having instructions encoded thereon that, when executed by at least one processor, performs operations to locate a submerged vehicle 24 in the fluid column 14 located in an area of interest remotely from the at least one sensor 12. The instructions include instructions to sense a signal carried by an IW moving along the interface 16, and instructions to back project the sensed signal to determine a signal source location (i.e., the remote object to be detected, such as a submarine or submersible vehicle), and instructions to record the signal source location.

With continued reference to FIG. 1, the sensor 12 is generally depicted as a thermistor. In one example, the thermistor may be a first thermistor 12A positioned along a first string 26. The first string 26 may include other thermistors 12B-12N where N is any integer. The thermistors on the string may vary by embodiment; however, it is envisioned that each thermistor 12A-12N will be spaced apart along the string at least semiregular intervals of about one meter. In accordance with one aspect of the present disclosure, the string 26 is suspended in the fluid or water column 14 at a depth that transects interface 16 so as to provide some thermistors located in the first layer 18 and some thermistors being located in the second layer 20. Stated otherwise, the interface 16 is positioned below an upper end of string 26 and the interface 16 is positioned above a lower end of string 26.

At least one of the temperature sensors 12 on the string 26 is in communication with the storage medium 22 through a network 28. Network 28 may be effectuated by a wireless or wired connection so as to enable data from the sensor 12 to be sent or transferred to the storage medium 22 as one having ordinary skill in the art would understand. In one particular embodiment, the storage medium 22 may be carried by a remote computer 30. The remote computer 30 may be located onboard a ship that processes the data sent from the sensors 12 or may be located remotely onshore at a central command center.

System 10 may further include a second string of temperature sensors. The second string 32 is spaced apart a distance 34 from the first string 26. In one embodiment, the separation distance between the first and second strings 26, 32 may be on the order of about one kilometer. The reason the distance 34 is significantly separated between the first string 26 and the second string 32 is that the amplitude and wave lengths of signals transmitted by the IW near the interface 16 may be very large; thus, the spacing distance 34 between the first string 26 and the second string 32 should also be large. Second string 32 may also include similar sensors 12A-12N having similar configurations spaced along the second string 32 in operable communication with medium 22. When the sensors 12 are carried by a string, such as first string 26 or second string 32, the sensors 12 may have pressure transducers thereon, such as pressure transducer 36, so as to recognize the depth of each respective sensor 12 in the fluid column 14. The depth of the sensor 12 is used when calculating the location of the submersible vehicle 24.

In accordance with another aspect of the present disclosure, it is not required that the at least one temperature sensor 12 be carried by strings 26, 32. For example, an expendable thermograph could be utilized to record temperatures of the fluid column 14 as it is dropped and sinks within the fluid column 14 measuring temperature during the sinking of the thermograph. Alternatively, another sensor 12 could provide a single thermistor oscillating up and down on an unmanned submersible vehicle so as to obtain various temperature measurements in the fluid column 14 between the upper first layer 18 and the lower second layer 20. Alternatively, additional manners of observing the temperature in the fluid column 14 may be accomplished by providing LIDAR 15 from an airborne vehicle 13. The present disclosure may be effectuated by any temperature sensor that will establish and provide a temperature profile through the fluid column 14. LIDAR 15, which stands for Light Detection and Ranging, is a remote sensing method that uses light in the form of a pulsed laser to measure ranges (variable distances) to the Earth. LIDAR is a detection system that works on the principle of radar, but uses light from a laser.

The interface 16 is established between the less-dense and/or warmer first layer 18 being positioned above a more-dense and/or cooler second layer 20. Ms operate at or near the interface 16 between the first layer 18 and the second layer 20. The IW spectrum is a known range that is frequently studied by oceanographers. The system 10 exploits the ambient IW spectrum so as to filter it out in order to locate the submersible vehicle 24 when a ping 38 indicates that the submersible vehicle 24 is operating at or near the interface 16 between the first layer 18 and the second layer 20.

In accordance with an aspect of the present disclosure, the system 10 maps the dispersion relationship so as to enable the system 10 to back project the ping 38 to the point of origin so as to identify the potential location of the submersible vehicle 24. The self-mapping of the dispersion relationship through the water and the IW spectrum is accomplished based on the wave length (i.e., the speed) and the frequency of the IW occurring near the interface 16. The ambient IW spectrum is identified so that it may be filtered out during the processing so as identify the location of the submersible vehicle 24 based on the signatures coming from the submersible vehicle 24.

In operation, one of the initial steps for ASW is to determine whether there is a submarine anywhere within an area of interest. Once it determines that there is a submarine somewhere within the area of interest, a variety of known detection manners may be implemented to more precisely locate the submarine. These known manners include acoustical and visual detection mechanisms. The system 10 helps identify whether or not there is a ping 38 (i.e., yes, there is a submarine operating in the area of interest). Once a ping 38 is determined, then system 10 can alert other identification systems to execute their methods for locating the submersible vehicle 24 with other signatures (i.e., visual or acoustic).

The system 10 and its method of implementation will first obtain a temperature and/or density profile of the fluid column 14 through the first layer 18 (i.e., the mixed layer (ML)). In addition to obtaining the temperature of the first layer 18, the method may further include obtaining a density profile of the fluid column 14. When a temperature profile has been identified, the interface 16 can be accurately located so as to know where to place one or more sensors 12 in the fluid column 14. Depth of the interface 16 is known to position some thermistors or other sensors above the interface 16 inside the ML or first layer 18 and position some of the sensors 12N below the interface 16 in the more-dense or cooler second layer 20.

During the operation of system 10, the sensors 12 measure temperatures and fluctuations of the interface 16 as the waves move past the string of sensors 12. The sensors 12 are then able to back project using ambient noise techniques applied to the transverse wave moving along interface 16 so as to identify the source of the ping 38 coming from submersible vehicle 24.

The sensors 12 are correlated together after obtaining a large time series of events from at least two strings 26, 32. Instructions in the storage medium 22, when executed by one or more processors, perform a frequency dependent cross correlation analysis to determine how long the signal moving along interface 16 took to get from the first string 26 to the second string 32. This enables the system 10 to determine a dispersion relationship along that path. The data is timestamped and the location of the strings 26, 32 is known. From this information, the back project technique can be utilized so as to identify the location of the ping 38. It is to be understood that the sensors 12 carried by strings 26, 32 may be drifting in the ocean; therefore, additional calculations may be utilized to filter out the drifting effect of the sensors 12 when the location of the sensors 12 is to be determined prior to back propagating the source of the signal. The operation of the method further filters out natural background perturbations in the ambient IW.

Because the ML (i.e., near interface 16) of the ocean varies at different locations, the system 10 takes into account different oceanographic information which may be obtained from oceanography sources. This enables the system 10 to optimize the temperature sensors 12 in a manner that most accurately transect the ML across the interface 16. Thus, in one embodiment, the network 28 may persistently feed oceanographic data to the sensors 12 so as to enable the sensors 12 to persistently monitor the interface 16 along which the IW moves to appropriately ensure that the string or other sensors carried by another device appropriately transect the interface 16.

In accordance with another aspect of the present disclosure, system 10 provides an "IW seismic array analogue" solution to exploit information in the ambient and active components of the IW field via persistent observation. Persistent measurements of the IWs can be obtained, for example, by a string of thermistors that transects the thermocline. The passage of an IW manifests as a temperature differential that oscillates along the string. A measurement of the IW field can be performed by an array of such temperature strings.

In passive-mode processing, cross correlation terms can be computed between array nodes (strings); and these cross correlation functions can be used to estimate the Green's functions between nodes (i.e., sensors 12). The Green's function emerges after sufficient stacking of the cross-correlograms, and is obtained as the time derivative of the correlation. These Green's function estimates can be used to estimate the dispersion relation within the array and to image reflective sources within the field. An object (i.e., submersible vehicle 24) within the IW field can be detected by its effect on the ambient noise background, even if it is not generating any IW energy itself. In active mode processing, the array can be used to locate sources of induced IWs (e.g., submarines) by back projection to the source location. Back projection accuracy can be enhanced through application of IW dispersion measurements extracted from passive mode processing.

System 10 takes advantage of the phenomenology of ocean IWs, both from active and passive sources, and the measurement of those waves with techniques derived from ANT. Wind and waves can mix the shallowest waters to provide near-uniform temperature and salinity in the ML (i.e., first layer 18). The thickness of the ML can range from a few meters to about 200 meters [consistent]. At the base of the ML, near interface 16, the thermocline can be very steep, with temperature decreasing quickly as depth increases. The vertical density gradient between shallow warm (less dense) water and deeper cool (more dense) water enables IWs to propagate. The internal-wave-generation potential is characterized by the peak Brunt-Väisälä (BV) frequency N, given by: $N^2 \cong -(g/\rho)\partial\rho/\partial z$ (radians/sec)$^2$, where r is the density and g=9.8 m/sec$^2$. IW propagation speeds are typically of order 10-100 cm/s and have periods measured in cycles per hour.

The ambient IW energy is limited at the high frequencies by the BV frequency N and at low frequencies by the Coriolis frequency f, $f=2\Omega \sin(\varphi)$ where $\Omega$ is the Earth's rotational angular frequency and $\varphi$ is the latitude. The spectral energy distribution of the ambient noise field is typified by the Garrett-Munk spectrum, which falls off approximately as (frequency)$^{-2}$ with a cutoff near N.

A vehicle 24 moving through or near the thermocline or interface 16 will excite IWs either directly, or via its turbulent wake. These waves are excited as the vehicle pushes a volume of higher density water across the thermocline into the lower density region above, or vice versa. This action sets up buoyancy oscillations in the water column; such oscillations have their primary mode of oscillations near the BV frequency. Because the density differences across the base of the ML are on the order of parts per thousand, the amplitude of the wave can be very large, on the order of many meters. The exact frequency spectrum of these excited IWs will depend on the size, speed, and configuration of the vehicle.

Ambient noise measurements have been exploited in fields such as geophysics, seismology, and acoustics to obtain information about the medium through which noise propagates. The technique, broadly known as ANT, is based on the observation that cross correlations of noise measurements within a system can be used to determine the Green's function of that system. If $C_{AB}(\tau)$ is the expectation value of the cross correlation between two points $x_A$, $x_B$, in an isotropic ambient noise field, then: $\partial C_{AB}(\tau)/\partial \tau \propto [G(x_A,x_B,\tau) - G(x_A,x_B,-\tau)]$, where $G(x_A,x_B,\tau)$ is the Green's function. The Greens function characterizes the impulse-response behavior of the system, and, with an estimate of the Green's function, the medium's dispersion relation can be estimated and mapped. This technique can be applied to any ambient wave field in which non-zero point-to-point cross correlation function can be measured.

Figure 2:
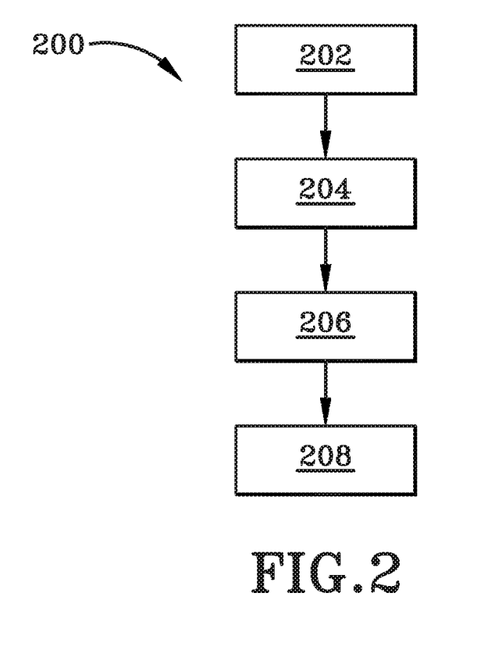
FIG. 2 is a flow chart depicting a method in accordance with the present disclosure.

FIG. 2 depicts a method in accordance with the present disclosure shown generally at 200. Method 200 includes deploying at least one sensor 12 in a fluid column 14 to sense an IW in the fluid column near the interface 16 between two fluid layers 18, 20 of differing parameters, shown generally at 202. Method 200 further includes sensing an IW in the fluid column with the sensor 12, shown generally at 204. The method 200 further includes a remote object, such as submersible vehicle 24, from the IW sensed at the sensor 12, shown generally at 206. Method 200 may further include reporting the location of the remote object, shown generally at 208. Method 200 may include additional steps or additional processes. By way of non-limiting example, some additional processes of method 200 may include mapping a dispersion relationship between a wave length and frequency of the IW and back projecting the IW to a ping, wherein the ping is generated by the remote object located near the interface between the fluid layers. Method 200 may further include sensing naturally generated ambient IWs, and filtering out the naturally generated ambient waves during the step of locating a remote object. Method 200 may further include identifying a scatter in the IW generated by the remote object submerged in the fluid column and processing the scatter to locate the remote object when the remote object is stationary in the fluid column near the interface 16. Method 200 may further include processing signatures in the IWs moving in a first direction generated by the remote object and processing deficiencies in the IW moving in an opposite direction generated by the remote object. The method 200 may further include sensing the remote object when the remote object transitions through the interface wherein the ping is generated when the remote object transitions through the interface between the two layers in the fluid column. This may be accomplished when the submersible vehicle 24 is surfacing from a deep depth and must transition through the interface or when the submersible vehicle 24 is diving to a cruising depth and transitions through the interface 16. Method 200 may further include identifying whether the submersible vehicle is within an area of interest based on the ping generated by the transition between the two layers in the fluid column, then prosecuting the ping to determine the location of the submersible vehicle, and sensing the IW at the interface with at least two strings of thermistors.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN), or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A method comprising:
   deploying at least one temperature sensor to sense an internal wave (IW) in a fluid column near an interface between two fluid layers of differing parameters;
   sensing the IW in the fluid column with the at least one temperature sensor;
   locating a remote object from the IW sensed at the at least one temperature sensor; and
   recording a location of the remote object in a storage medium.

2. The method of claim 1, further comprising:
   mapping a dispersion relationship between a wavelength and frequency of the IW; and
   back projecting the IW to a ping, wherein the ping is generated by the remote object located near the interface between the two fluid layers.

3. The method of claim 2, further comprising:
   sensing naturally generated ambient IWs; and
   identifying the naturally generated ambient IWs.

4. The method of claim 3, further comprising:
   identifying scatter in the IW generated by the remote object submerged in the fluid column; and
   processing the scatter to locate the remote object when the remote object is stationary in the fluid column.

5. The method of claim 4, further comprising:
   processing signatures in the IW moving in a first direction generated by the remote object; and
   processing deficiencies in the IW moving in an opposite second direction generated by the remote object.

6. The method of claim 2, further comprising:
   sensing the ping when the remote object transits through the interface between the two layers in the fluid column.

7. The method of claim 6, wherein the remote object is a submersible vehicle, further comprising:
   identifying whether the submersible vehicle is within an area of interest based on the ping generated by the transition between the two fluid layers in the fluid column;
   prosecuting the ping to determine the location of the submersible vehicle; and
   sensing the IW at the interface with at least two horizontally separated measurements.

8. The method of claim 1, wherein the differing parameters of the two fluid layers refer to differing densities or differing temperatures between the two fluid layers.

9. The method of claim 1, further comprising:
   locating the at least one temperature sensor when the IW is sensed; and
   accounting for locus drifting in the fluid column when determining a location of the at least one temperature sensor.

10. The method of claim 9, further comprising:
    determining a locus depth of the at least one temperature sensor in the fluid column when the IW is sensed.

11. The method of claim 1, further comprising:
    determining frequency characteristics of the IW over a period of time, wherein the period of time exceeds at least one day so as to effectuate persistent surveillance of an area of interest in an ocean;
    processing local oceanographic data, wherein a naturally generated ambient IW component is identified within the measured IW based, at least in part, on the local oceanographic data.

12. The method of claim 1, further comprising:
    recording, at least temporarily, a location of the remote object in computer implemented medium; wherein the remote object is a submersible vehicle.

13. A system for detecting a remote object submerged in a fluid column comprising:
    at least one sensor for sensing at least one of a temperature profile of the fluid column or a density profile in the fluid column, wherein an interface is defined between a less dense or warmer first fluid layer and a more dense or cooler second fluid layer, wherein the second layer is below the first layer;
    at least one non-transitory computer readable storage medium having instructions encoded thereon that, when executed by at least one processor, performs operations to locate a submerged vehicle in the fluid column located in an area of interest remotely from the at least one sensor, and the instructions including:
    logic to sense a signal carried by an internal wave (IW) moving along the interface;
    logic to back project the sensed signal to determine a signal source location; and
    logic to record the signal source location.

14. The system of claim 13, further comprising:
    a string of thermistors submerged in the fluid column, wherein the at least one sensor is a thermistor on the string of thermistors.

15. The system of claim 14, further comprising:
    a pressure transducer on the string adapted to determine depth of the thermistor; and wherein the at least one sensor is submerged in the fluid column at a depth in a range from about 1 m to about 100 m.

16. The system of claim 13, further comprising:
    a shadowing or scattering of the IW created by the remote object remaining stationary near the interface.

17. The system of claim 13, further comprising:
    a signature in the IW created by the remote object moving near the interface.

18. The system of claim 13, further comprising:
    a ping generated by the remote object transitioning from the first fluid layer to the second fluid layer, or vice versa.

19. The system of claim 13, further comprising:
    local oceanographic data including an ambient IW spectrum, wherein the ambient IW spectrum is identified within the sensed IW in order to locate the remote object based, at least in part, the non-ambient component of the sensed signal in the IW.

20. The system of claim 13, further comprising:
a Light Detection and Ranging system (LIDAR) on a vehicle positioned above a portion of the fluid column which senses the temperature or density profile of the fluid column.

\* \* \* \* \*